(12) United States Patent
Loudon et al.

(10) Patent No.: US 6,408,229 B1
(45) Date of Patent: Jun. 18, 2002

(54) METHOD AND APPARATUS FOR DETECTING AND SIGNALING RACETRACK OPERATION OF A MOTOR VEHICLE

(75) Inventors: Steven Paul Loudon, Howell; Michael Douglas Rizzo, White Lake; Kevin J Zelenka, Highland; Todd David Brown, Brooklyn, all of MI (US)

(73) Assignees: Delphi Technologies, Inc., Troy; General Motors Corporation, Detroit, both of MI (US)

( * ) Notice: Subject to any disclaimer, the term of this patent is extended or adjusted under 35 U.S.C. 154(b) by 0 days.

(21) Appl. No.: 09/669,436

(22) Filed: Sep. 25, 2000

(51) Int. Cl.[7] ............................................... A63B 71/00
(52) U.S. Cl. .............................. 701/1; 701/70; 340/438
(58) Field of Search ......................... 701/1, 70; 340/438

(56) References Cited

U.S. PATENT DOCUMENTS

| 5,194,861 A | 3/1993 | Clair |
| 5,241,487 A | 8/1993 | Bianco |
| 5,420,903 A | 5/1995 | Newton |
| 5,487,006 A | 1/1996 | Kakizaki et al. ........ 364/424.05 |

*Primary Examiner*—Michael J. Zanelli
(74) *Attorney, Agent, or Firm*—Robert M. Sigler

(57) ABSTRACT

A motor vehicle mounted system is responsive to sensed or estimated vehicle lateral acceleration and vehicle speed for detecting and signaling when the vehicle is operating on a racetrack. The system determines whether the vehicle is in a high lateral acceleration state or a low lateral acceleration state and when the vehicle is maintaining a minimum speed. The system increments a count when the vehicle is in the high lateral acceleration state if the vehicle has maintained the minimum speed for a first time since the last increment or decrement of the count and decrements the count when the vehicle is in the low lateral acceleration state if the vehicle has maintained the minimum speed for a second time since the last increment or decrement of the count. The system detects and signals operation on a racetrack while the count exceeds a predetermined threshold count and otherwise detects and signals no operation on a racetrack. Racetrack driving is thus detected through repeated episodes of high lateral acceleration during high speed turns on racetrack curves and corners.

10 Claims, 3 Drawing Sheets

| VSPEED (kph) | LA THRESH (g) |
|---|---|
| 0 | 0.85 |
| 50 | 0.85 |
| 100 | 0.8 |
| 150 | 0.7 |
| 200 | 0.6 |
| 250 | 0.5 |

METHOD AND APPARATUS FOR DETECTING AND SIGNALING RACETRACK OPERATION OF A MOTOR VEHICLE

TECHNICAL FIELD

The technical field of this invention is the on-board detection of motor vehicle operating environments, and particularly the detection of a racetrack operating environment from vehicle dynamic behavior alone.

BACKGROUND OF THE INVENTION

Some vehicles are designed to be operated in two operating environments: (1) on a racetrack and (2) off the racetrack on public roads. Such vehicles may have vehicle systems with a first desired mode of operation on a racetrack and a second desired mode of operation off-track. Although an operator switch can be provided for the operator to select the mode of operation on knowledge of the vehicle operating environment, it may be preferable to provide automatic operating environment sensing and switching by the vehicle itself, either alone or as a backup to operator switching. But an automatic system for switching vehicle operating behavior between on-track and off-track modes requires apparatus for detecting vehicle operation on a racetrack.

SUMMARY OF THE INVENTION

This invention provides a method and apparatus for detecting and signaling when a motor vehicle is operating on a racetrack. The method and apparatus determines whether the vehicle is in a high lateral acceleration state or a low lateral acceleration state and when the vehicle is maintaining a minimum speed. The method and apparatus increments a count when the vehicle is in the high lateral acceleration state if the vehicle has maintained the minimum speed for a first time since the last increment or decrement of the count and decrements the count when the vehicle is in the low lateral acceleration state if the vehicle has maintained the minimum speed for a second time since the last increment or decrement of the count. The method and apparatus detects and signals operation on a racetrack while the count exceeds a predetermined threshold count and otherwise detects and signals no operation on a racetrack. Racetrack driving is thus detected through repeated episodes of high lateral acceleration during high speed turns on racetrack curves and corners.

In a preferred embodiment, the method and apparatus of the invention includes a vehicle mounted accelerometer and a time accumulator repeatedly incremented while the magnitude of an output signal of the lateral accelerometer exceeds a predetermined lateral acceleration threshold and cleared when the magnitude of the output signal of the lateral accelerometer falls at least an offset value below the lateral acceleration threshold. A high lateral acceleration state is determined when the time accumulator has accumulated a total time greater than a reference accumulated time; otherwise a low lateral acceleration state is determined. This provides hysteresis and stability in the system.

In a preferred embodiment, the second time, for which low lateral acceleration must be maintained in order to decrement the count, has a first value when the vehicle speed is greater than a predetermined speed greater than a racetrack caution speed and a second value greater than the first value when the vehicle speed is less than the predetermined speed greater than a racetrack caution speed. This prevents loss of racetrack detection during caution periods on the racetrack, when vehicle speeds and lateral accelerations are lower than under full racing conditions, without unduly lengthening the time required to detect no racetrack after the vehicle leaves the racetrack.

DESCRIPTION OF A PREFERRED EMBODIMENT

Figures 1, 3:
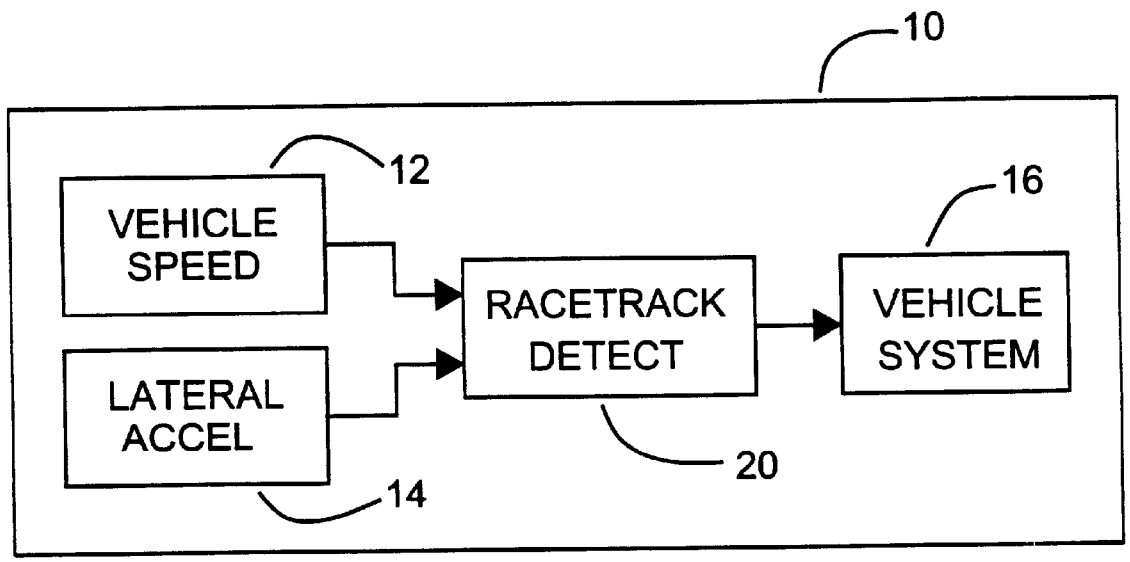
FIG. 1 shows a schematic block diagram of a motor vehicle having apparatus according to the invention.
FIG. 3 shows a lookup table for threshold LA THRESH as a function of vehicle speed.

Referring to FIG. 1, a motor vehicle 10 is designed for operation on a racetrack and also for off-track operation. Motor vehicle 10 is equipped with a vehicle speed sensor 12 of any type known in the art for providing a signal of forward vehicle speed and a lateral acceleration sensor 14. motor vehicle 10 is also equipped with a vehicle system 16 having at least one operating mode intended for racetrack operation and another operating mode intended for off-track operation. An example of vehicle system 16 is a vehicle suspension control having alternative racetrack and off-track damping control modes.

Motor vehicle 10 is further provided with a racetrack detection and signaling apparatus 20 comprising a digital computer receiving inputs from vehicle speed sensor 12 and lateral accelerometer 14 and providing an output racetrack detect signal to vehicle system 16. Apparatus 20 runs a racetrack detection routine on a clocked time basis, for example once every 0.01 seconds, as shown in FIGS. 2A and 2B.

Figure 2A:
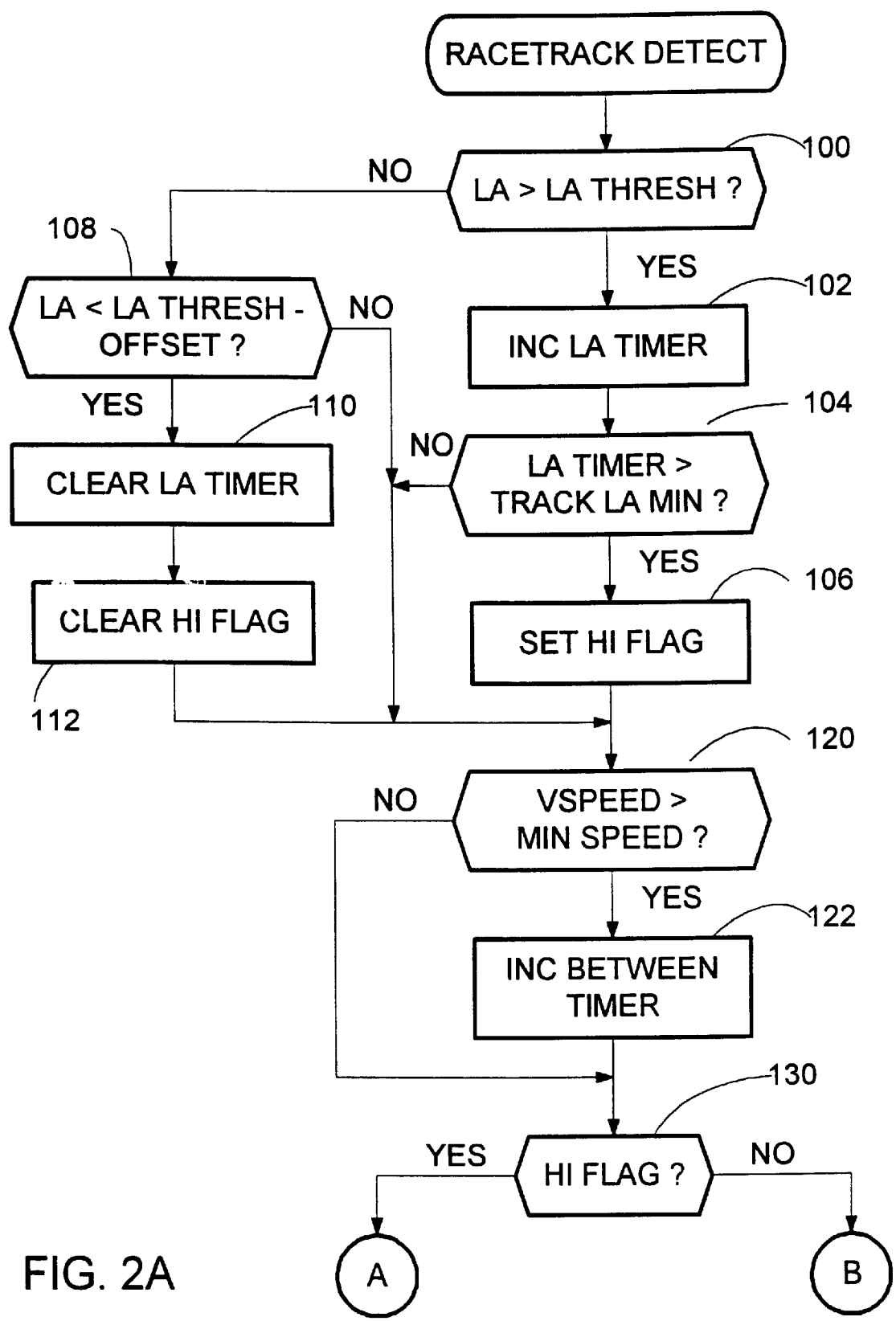
FIGS. 2A and 2B show a flow chart illustrating the operation of the apparatus of the vehicle of FIG. 1.
Figure 2B:
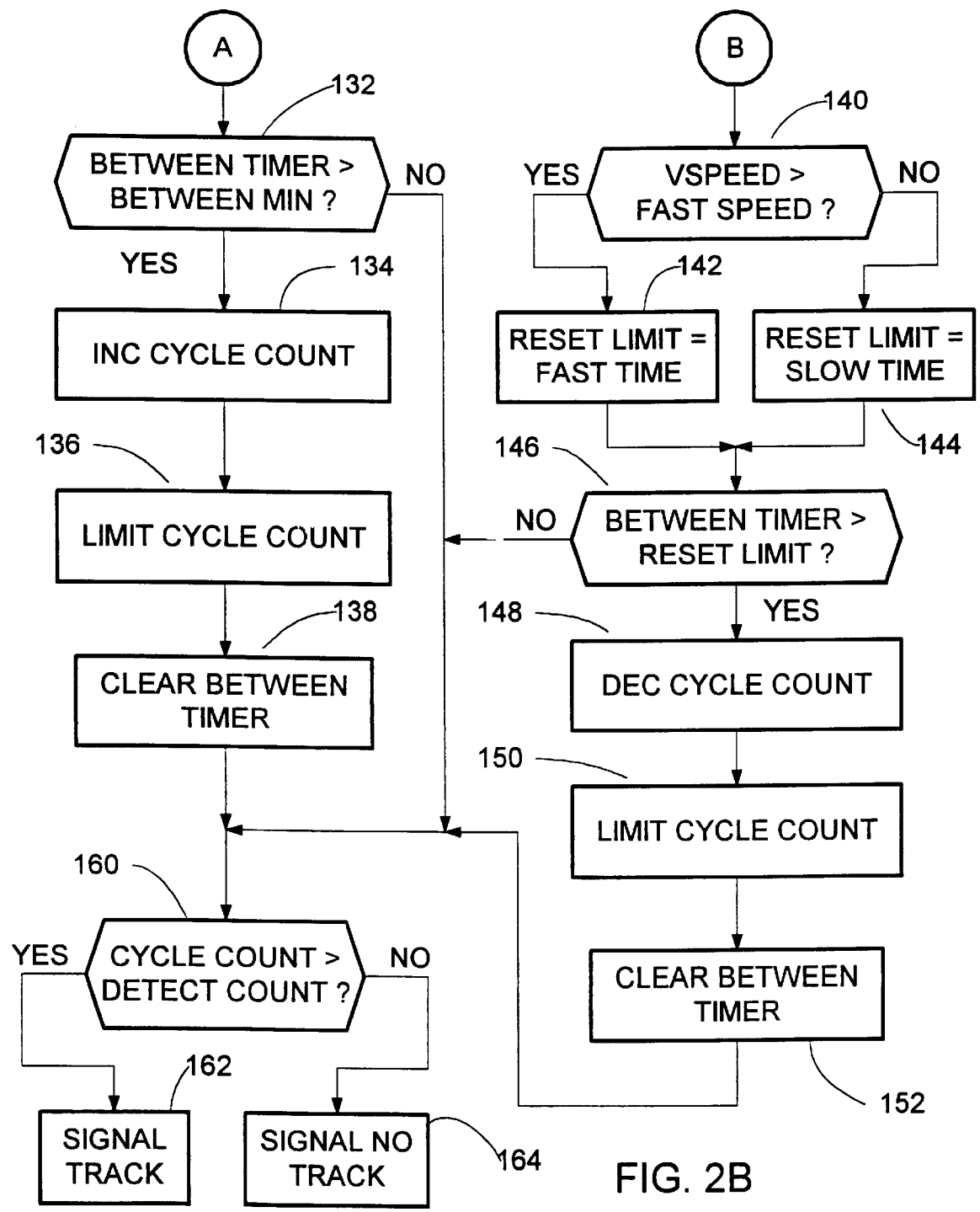

Referring to FIG. 2A, program RACETRACK DETECT begins in step 100 by comparing a lateral acceleration value LA with a lateral acceleration threshold value LA THRESH. The value LA is derived from the magnitude of the signal provided by lateral acceleration sensor 14; and the threshold value LA THRESH is derived from stored values in a lookup table as an inverse function of vehicle speed provided by vehicle speed sensor 12. A typical such lookup table appears in FIG. 3. Alternatively, the lateral acceleration may be estimated from wheel speeds or steer angle according to methods known in the art with inputs from the appropriate sensors.

If the lateral acceleration LA exceeds LA THRESH in step 100, a lateral acceleration timer count LA TIMER is incremented in step 102. The incremented value of LA TIMER is compared with an accumulated lateral acceleration reference time TRACK LA MIN in step 104; and, if it exceeds the reference, a HI FLAG is set in step 106. If it does not exceed the reference, step 106 is skipped. If the lateral acceleration LA does not exceed the threshold LA THRESH in step 100, it is compared in step 108 with a lower, hysteresis value derived by subtracting a value OFFSET (e.g. 0.15 g) from LA THRESH. If it is less than the lower value in step 108, the LA TIMER value is cleared to zero in step 110; and the HI FLAG is cleared in step 112. If it is not less than the lower value in step 108, steps 110 and 112 are skipped.

Since the routine is run on a clocked time basis, LA TIMER is essentially a time accumulator, which counts LA TIMER upwards in steps of 0.01 seconds when the measured or estimated lateral acceleration value LA exceeds LA THRESH, clears LA TIMER to zero if the measured or estimated lateral acceleration value LA falls below the lower value LA THRESH—OFFSET, and otherwise does not change the value of LA TIMER. Steps 100 through 112 thus provide a HI FLAG signal, which indicates a high lateral acceleration state, while the lateral acceleration value LA has exceeded the threshold value LA THRESH for a total calibrated time (e.g. 1 second) without falling below the lower value LA THRESH—OFFSET.

The next portion of the routine increments another timer during each loop wherein the vehicle speed VSPEED exceeds a reference MIN SPEED. In step 120 a value VSPEED, derived from the input vehicle speed from vehicle speed sensor 12, is compared with the reference MIN SPEED, which is given a fairly low value: e.g. 20 kph. If VSPEED exceeds the reference, a count BETWEEN TIMER is incremented in step 122; otherwise, step 122 is skipped. Thus, as long as the vehicle is moving with any significant speed, whether on a racetrack or not, BETWEEN TIMER will be incremented during each loop, although BETWEEN TIMER is often cleared to zero under conditions described below.

The next portion of the program has two parallel paths, one if the HI FLAG is set and one if it is cleared. Thus, at step 130, the HI FLAG is checked. If it is set, the routine follows path A, in which a determination is made whether or not a racetrack detection value CYCLE COUNT is to be incremented; if not, the routine follows path B, in which a determination is made whether or not to decrement CYCLE COUNT. In either case, the description continues with reference to FIG. 2B.

Following path A, BETWEEN TIMER is compared in step 132 with a reference BETWEEN MIN, which may be given a calibrated value of, for example, 5 seconds. If BETWEEN TIMER exceeds BETWEEN MIN, the value CYCLE COUNT is incremented in step 134 and then limited, if necessary, in step 136, to a maximum value: e.g. 22. BETWEEN TIMER is then cleared in step 138. If BETWEEN TIMER does not exceed BETWEEN MIN in step 132, steps 134–138 are skipped. The purpose of the BETWEEN TIMER is to help provide an exclusion time in which CYCLE COUNT cannot be changed, in order to prevent CYCLE COUNT from being incremented or decremented too rapidly. In path A, in which the concern is the incrementing of CYCLE COUNT, the reference BETWEEN MIN is provided with a value that will prevent two consecutive increments of CYCLE COUNT within a 5 second period. Since BETWEEN TIMER is cleared to zero each time CYCLE COUNT is incremented, CYCLE COUNT will not rapidly count upward in consecutive loops of the routine on a single turn of the vehicle or corner of a racetrack.

In the case of a low lateral acceleration state, following path B, a RESET LIMIT value is first chosen as a function of vehicle speed. In step 140, the vehicle speed value VSPEED is compared with a reference speed FAST SPEED, e.g. 100 kph. The value of FAST SPEED is chosen to be close to but somewhat greater than a typical speed run by all the cars at a racetrack in pace laps or caution conditions. If the vehicle speed value is greater than FAST SPEED, then RESET LIMIT is set in step 142 to a short value FAST TIME (e.g. 20 seconds), since such higher speeds are indicative of off-track driving on a limited access highway. If it is not greater, then RESET LIMIT is set in step 144 to a longer value SLOW TIME (e.g. 40 seconds), since such lower speeds are indicative of pace laps or caution conditions on a racetrack. This choice of times for use in the determination of whether or not to decrease the CYCLE COUNT with the HI FLAG cleared allows an increase in immunity from signaling no track during caution or yellow flag laps while still allowing quicker detection and signaling of no track after the vehicle has left a racetrack.

Once the value of RESET LIMIT is set, path B proceeds to step 146, in which the value of BETWEEN TIMER is compared to RESET LIMIT. If it is greater, CYCLE COUNT is decremented in step 148 and limited, if necessary, to zero in step 150. Next, BETWEEN TIMER is cleared to zero in step 152. If BETWEEN TIMER is not greater than RESET LIMIT in step 146, steps 148–152 are skipped.

Finally, a racetrack is detected or not detected by comparing CYCLE COUNT to a reference DETECT COUNT (e.g. 7) in step 160. If it is greater, a racetrack is detected and the detection is signaled in step 162. If it is not, then no racetrack is detected; and this is signaled in step 164. The signal produced may be passed to vehicle system 16.

To summarize, a racetrack is detected on the basis of a CYCLE COUNT, which is initialized at zero and may vary between zero and a high limit value. CYCLE COUNT may be incremented when a high lateral acceleration state is determined or decremented when a low lateral acceleration condition is determined; but any change in CYCLE COUNT is made only when the vehicle has maintained a minimum vehicle speed for a predetermined exclusionary time measured from the last change in CYCLE COUNT, whether an increment or a decrement. And the determination of a high lateral acceleration condition itself requires a measured or estimated lateral acceleration value exceeding a reference for a period of time (e.g. 1 second) without once falling below the reference lowered by an offset value for hysteresis.

What is claimed is:

1. Method for detecting and signaling when a motor vehicle is operating on a racetrack, comprising the steps:

determining when the vehicle is in a high lateral acceleration state or a low lateral acceleration state;

determining when the vehicle is exceeding a minimum speed;

incrementing a count when the vehicle is in the high lateral acceleration state if the vehicle has maintained the minimum speed for a first time since the last increment or decrement of the count;

decrementing the count when the vehicle is in the low lateral acceleration state if the vehicle has maintained the minimum speed for a second time since the last increment or decrement of the count; and signaling operation on a racetrack while the count exceeds a predetermined threshold count and otherwise signaling no operation on a racetrack.

2. Method of claim 1 in which the second time is greater than the first time.

3. Method of claim 1 wherein the step of determining when the vehicle is in a high lateral acceleration state or a low lateral acceleration state determines a high lateral acceleration when a measured lateral acceleration of the vehicle has exceeded a first reference lateral acceleration reference for at least an accumulated lateral acceleration reference time without falling below a second reference lateral acceleration reference less than the first reference and otherwise determines a low lateral acceleration.

4. Method of claim 1 wherein the step of determining when the vehicle is undergoing a high lateral acceleration or a low lateral acceleration determines a high lateral acceleration when an estimated lateral acceleration of the vehicle, derived from a measured lateral acceleration related vehicle dynamic variable, has exceeded a first reference lateral acceleration reference for at least an accumulated lateral acceleration reference time without falling below a second reference lateral acceleration reference less than the first reference and otherwise determines a low lateral acceleration.

5. Method of claim 1 wherein the second time has a first value when the vehicle speed is greater than a predetermined speed greater than a racetrack caution speed and a second value greater than the first value when the vehicle speed is greater than the predetermined speed greater than a racetrack caution speed.

6. Method of claim 1 in which the count being incremented and decremented is limited to predetermined high and low values with the predetermined threshold count therebetween.

7. Apparatus for detecting and signaling when a motor vehicle is operating on a racetrack, comprising:

means for determining whether the vehicle is in a high lateral acceleration state or a low lateral acceleration state;

means for determining when the vehicle is maintaining a minimum speed;

means for incrementing a count when the vehicle is in the high lateral acceleration state if the vehicle has maintained the minimum speed for a first time since the last increment or decrement of the count;

means for decrementing the count when the vehicle is in the low lateral acceleration state if the vehicle has maintained the minimum speed for a second time since the last increment or decrement of the count; and means for comparing the count to a predetermined threshold count, signaling operation on a racetrack while the count exceeds the predetermined threshold count and alternatively signaling no operation on a racetrack when the count does not exceed the predetermined threshold count.

8. Apparatus of claim 7 wherein the means for determining whether the vehicle is undergoing a high lateral acceleration or a low lateral acceleration comprises a lateral accelerometer on the vehicle.

9. Apparatus of claim 8 wherein the means for determining whether the vehicle is undergoing a high lateral acceleration or a low lateral acceleration further comprises a time accumulator repeatedly incremented while an output signal of the lateral accelerometer exceeds a predetermined lateral acceleration threshold and cleared when the output signal of the lateral accelerometer falls at least an offset value below the lateral acceleration threshold.

10. Apparatus of claim 9 wherein the means for determining whether the vehicle is undergoing a high lateral acceleration or a low lateral acceleration determines a high lateral acceleration when the time accumulator has accumulated a total time greater than a reference accumulated time and otherwise determines a low lateral acceleration.

\* \* \* \* \*